(12) United States Patent
Yu

(10) Patent No.: US 8,803,845 B2
(45) Date of Patent: Aug. 12, 2014

(54) OPTICAL TOUCH INPUT SYSTEM AND METHOD OF ESTABLISHING REFERENCE IN THE SAME

(75) Inventor: Byung Chun Yu, Seoul (KR)

(73) Assignee: LG Display Co., Ltd., Seoul (KR)

( * ) Notice: Subject to any disclaimer, the term of this patent is extended or adjusted under 35 U.S.C. 154(b) by 646 days.

(21) Appl. No.: 12/969,129

(22) Filed: Dec. 15, 2010

(65) Prior Publication Data

US 2011/0157044 A1    Jun. 30, 2011

(30) Foreign Application Priority Data

Dec. 26, 2009  (KR) .................. 10-2009-0131363
Dec. 2, 2010   (KR) .................. 10-2010-0122016

(51) Int. Cl.
G09G 5/00 (2006.01)

(52) U.S. Cl.
USPC ...... 345/175; 345/173; 178/18.01; 178/18.09

(58) Field of Classification Search
USPC .................. 345/173–178; 178/18.01–18.09
See application file for complete search history.

(56) References Cited

U.S. PATENT DOCUMENTS

| | | | | |
|---|---|---|---|---|
| 7,460,110 | B2* | 12/2008 | Ung et al. ............ | 345/173 |
| 2001/0022579 | A1* | 9/2001 | Hirabayashi .......... | 345/175 |
| 2002/0163505 | A1 | 11/2002 | Takekawa | |
| 2008/0143690 | A1* | 6/2008 | Jang et al. ............ | 345/175 |
| 2009/0058833 | A1* | 3/2009 | Newton ................ | 345/175 |
| 2010/0295821 | A1* | 11/2010 | Chang et al. .......... | 345/175 |
| 2011/0141030 | A1* | 6/2011 | Chen .................... | 345/173 |

FOREIGN PATENT DOCUMENTS

| | | |
|---|---|---|
| CN | 201035550 Y | 3/2008 |
| CN | 101479691 | 7/2009 |
| CN | 101581999 | 11/2009 |
| JP | 2001-084093 | 3/2001 |
| KR | 1020090112200 A | 10/2009 |

OTHER PUBLICATIONS

Office Action issued in corresponding Japanese Patent Application No. 2010-287931, mailed Oct. 11, 2012.
Office Search Report issued in corresponding Chinese Patent Application No. 201010597365.9, dated Jan. 21, 2013.
Office Action issued in corresponding Chinese Patent Application No. 201010597365.9, dated Jan. 31, 2013.
Office Action issued in corresponding Korean Patent Application No. 10-2010-0122016, mailed May 30, 2013.

* cited by examiner

*Primary Examiner* — Jennifer Nguyen
(74) *Attorney, Agent, or Firm* — Brinks Gilson & Lione

(57) ABSTRACT

A method of establishing a reference in an optical touch input system and a corresponding display panel, includes emitting light by emitters located at respective first, second, and third corners of the display panel, and receiving direct light by a detector located at a fourth corner of the display panel, the detector at the fourth corner detecting respective first, second, and third impulse signals generated by the direct light of the emitters located at the respective first, second, and third corners, the respective first, second, and third impulse signals corresponding to pixel positions of the detectors located at the fourth corner and correlating the respective pixel positions of the respective first, second, and third impulse signals with respective predetermined first, second, and third reference angles of the display panel.

14 Claims, 12 Drawing Sheets

OPTICAL TOUCH INPUT SYSTEM AND METHOD OF ESTABLISHING REFERENCE IN THE SAME

This application claims the benefit of the Korean Patent Application No. 10-2009-0131363, filed on Dec. 26, 2009 and Korean Patent Application No. 10-2010-0122016, filed on Dec. 2, 2010, which are hereby incorporated by reference as if fully set forth herein.

BACKGROUND

1. Field of the Invention

This disclosure relates to a method of sensing touch, and more particularly, to an optical touch input system configured to detect correct touch without reference to errors caused by positional variation and misalignment of optical sensor modules located in at least three corners of a display panel. Retro-reflectors are configured to retro-reflect light emitted by the optical sensor modules.

2. Discussion of the Related Art

In general, a touch input system is one of the components that interface between telecommunication devices having a variety of display types. A user may touch a screen of the touch input system by using a pen or finger.

The touch input system is an input device used by a wide variety of people because of its convenience and ease of use. As a result, the touch input systems are used in many applications, for example, certificate-issuing devices used in banks or public offices, various medical apparatus, guide devices used in sightseeing, guide devices for traffic systems, and the like.

The touch input system may be categorized into a resistive type touch input system, a micro capacitive touch glass, an ultrasonic wave glass, and an infrared type touch input system, based on a touch recognition type.

The resistive type touch input system is made of two transparent conductive layers. A bottom layer is formed of glass having a conductive material coated thereon, and a top layer is formed of film having conductive material coated thereon. The two layers are spaced apart by a predetermined distance by a micro-printed spacers, which electrically insulate the two layers. A predetermined voltage is applied to the two layers, respectively. When a finger, touch pen, or other object touches the top layer, a resistance of the top layer (X axis) or the bottom layer (Y axis) changes according to the location of the touch. Predetermined X and Y locations corresponding to the changed resistive values are computed by a controller, and the controller displays coordinates on a monitor or data is inputted and used as coordinate data.

The micro capacitive touch glass is made of a transparent glass sensor having a thin conductor coated thereon. An electrode pattern is precisely printed along an edge of a conductor layer, and a transparent glass protection coating layer is in close contact with the conductor layer to protect and cover the sensor. A voltage is applied to a screen, and the electrode pattern forms a low voltage field on a touch sensor conductive surface. When an object or finger touches the screen, minute currents are generated at touch points. The distance of the current flow from each corner is proportional to the distance from the corner to the object, such as the human finger. Accordingly, the touch screen controller computes the ratio of the current flow to detect the touch point coordinates.

The ultrasonic wave touch glass is made of 100% glass, and is not affected by surface damage or abrasion, compared with the other types of screen surfaces, where damage or abrasion would reduce the usage life of such a touch screen. A touch screen controller transmits an electric signal of 5 MHz to a transmitting converter configured to generate ultrasonic waves. The reflected waves pass over the panel surface. When a user pushes the touch screen surface, part of the ultrasonic waves passing the touch point is absorbed by the user. A received signal and a lost or reduced signal in a digital map may be identified by a controller, and a coordinate value of the point corresponding to the current change of the signal may be calculated accordingly. This process may be independently implemented with respect to the X and Y axes.

The infrared type touch input system uses an inherent property of an infrared ray in that a line-of-sight path is required. The infrared ray is blocked when it encounters an obstacle. A portion of the touch input system having pressure applied thereto by an object blocks the infrared rays emitted along horizontal and vertical directions. The X and Y coordinates of the blocked points are sensed. The infrared type touch input system identifies the touch point from the blockage of infrared scanning beams. To form a invisible infrared matrix, an infrared ray beam is emitted from a predetermined surface of each of X and Y axis, and the emitted infrared ray is received by the sensors on opposite sides of the touch input system.

Each touch input system has different advantages, and the infrared type touch input system has been receiving attention because of its convenience of installation and because it requires a very small pressure for activation and sensing.

An infrared type touch input system of related art will be described in reference to FIG. 1 as follows.

FIG. 1 is a plan view illustrating an infrared type touch input system of the related art.

As shown in FIG. 1, the infrared type touch input system includes a panel 10, infrared sensors 5 (and emitters) provided at two adjacent corners of the panel 10, and a reflector 7 provided in each of three sides of the panel 10.

In the related art panel, light emitted from the infrared sensors 5 (emitters) located in both opposite ends of the panel 10 is reflected, and the emitted light is blocked by the touch of the object, such as a finger. An angle formed by the light received may be computed to determine the location of the touch.

When the infrared type panel of the related art uses only two cameras, touch resolution is low in an upper area because a dead zone is generated, as shown in FIG. 1. Each point shown in FIG. 1 is the lowest resolution measurable by using triangulation.

Such a dead zone is generated in a predetermined area in which an angle formed by the infrared sensors 5 is greater than predetermined value, and touch detection cannot be implemented in the dead zone. Thus, touch sensing accuracy may deteriorate in this predetermined area, and thus it is necessary to compensate for the reduced accuracy. To compensate, the infrared sensors are positioned on the far outer corners of the touch panel so as to position the dead zone outside the viewing perimeter of the liquid crystal panel. Therefore, the touch input system is required to have a size greater than the size of the liquid crystal panel. As a result, a non-effective area exists and the touch input system must be larger than is otherwise required.

Typically, the touch input system and the liquid crystal panel are separate components. In manufacturing, complex methods are required to combine elements of each panel with each other and to couple the touch input system to a liquid crystal module.

Furthermore, it is difficult to select accurate coordinates in such a touch input system of the related art, and there is a disadvantage that only one touch point at one time can be recognized. In other words, when two points are simultaneously touched on the touch input system, the touch input system fails to recognize the touch or it recognizes only the first of the two touches, which may cause an error.

Two infrared sensors and reflectors may be used to determine touch coordinates by using triangulation. Typically, two light sources and sensors are located in an upper area of the touch input system, and the reflectors are located in three surfaces to retro-reflect the light emitted from the light sources. The light is blocked when the panel is touched with an object, which is sensed by a controller, and a corresponding angle of the received light is computed to recognize the touch. Tolerance or variation in the physical orientation of the infrared sensors (misalignment) may occur during manufacture and assembly of the infrared type touch input system of the related art, and such misalignment may cause touch errors.

BRIEF SUMMARY

A method of establishing a reference in an optical touch input system includes emitting light by emitters located at respective first, second, and third corners of the display panel, and receiving direct light by a detector located at a fourth corner of the display panel. The detector at the fourth corner detects respective first, second, and third impulse signals generated by the direct light of the emitters located at the respective first, second, and third corners. The respective first, second, and third impulse signals correspond to pixel positions of the detectors located at the fourth corner. The respective pixel positions of the respective first, second, and third impulse signals are correlated with the respective predetermined first, second, and third reference angles of the display panel.

It is to be understood that both the foregoing general description and the following detailed description are exemplary and explanatory, and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

In the drawings:

FIG. 2b is a rear-perspective views illustrating a corner of the optical touch input system not having an optical sensor module (emitter-detector module) as shown in FIG. 2a;

DETAILED DESCRIPTION OF THE DRAWINGS AND THE PRESENTLY PREFERRED EMBODIMENTS

Reference will now be made in detail to the specific embodiments of the present invention, examples of which are illustrated in the accompanying drawings. Wherever possible, the same reference numbers will be used throughout the drawings to refer to the same or like parts.

An optical touch input system according to an embodiment of the present invention, and a method of establishing references o the touch input system will be described in reference to the accompanying drawings.

Figure 1:
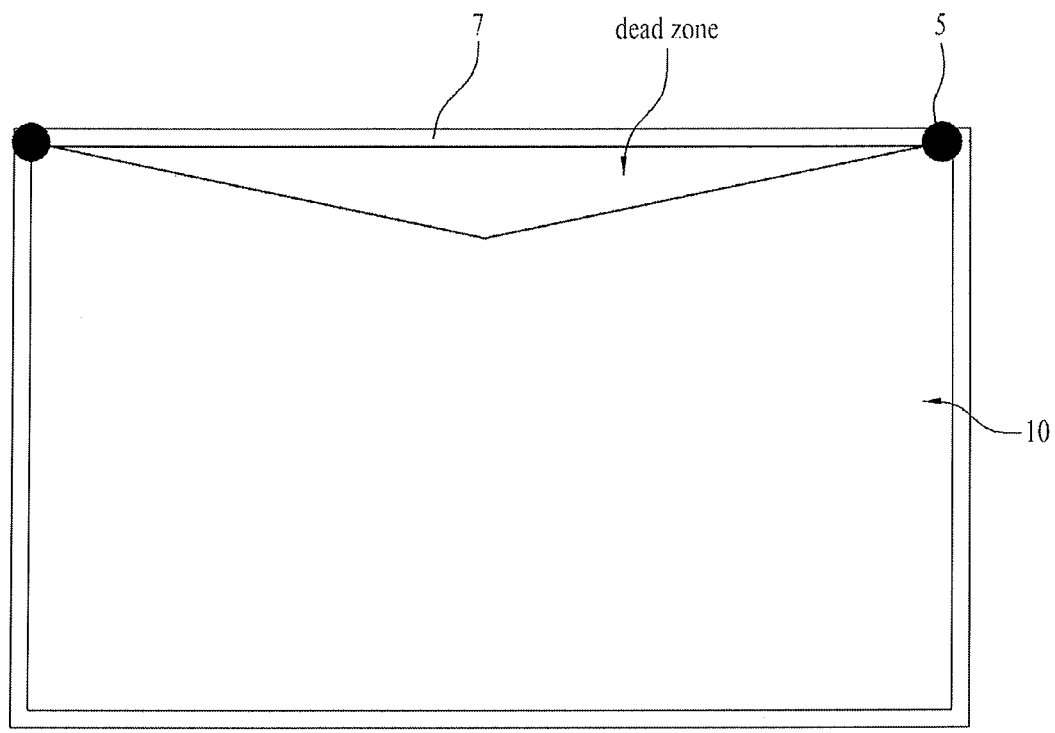
FIG. 1 is a plan view illustrating a touch sensing method, which is applicable to an infrared type touch input system.
Figure 2A:
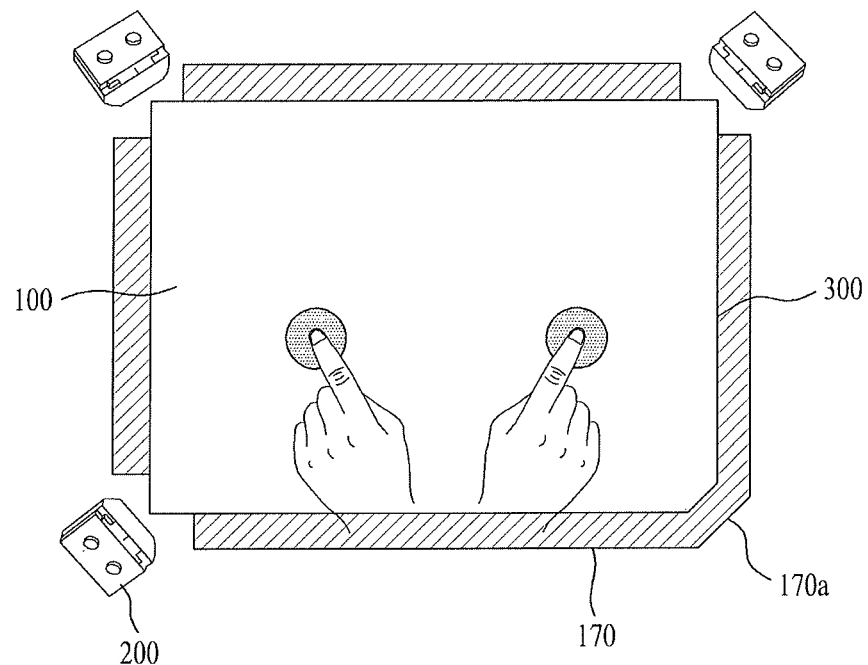
FIG. 2a is a plan view illustrating an optical touch input system according to an embodiment of the present invention.
Figure 2B:
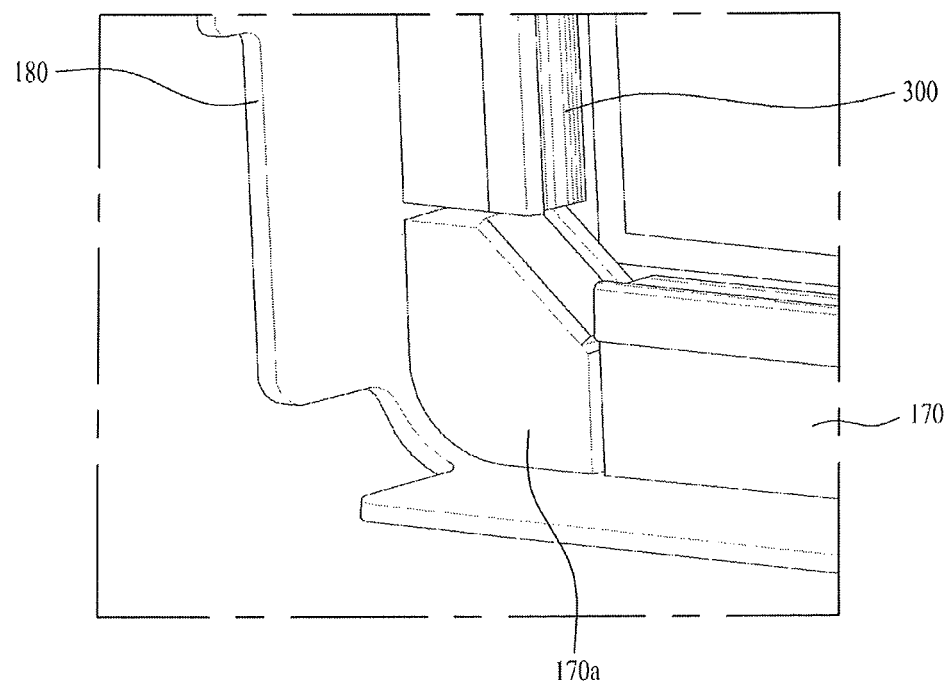
Figure 3:
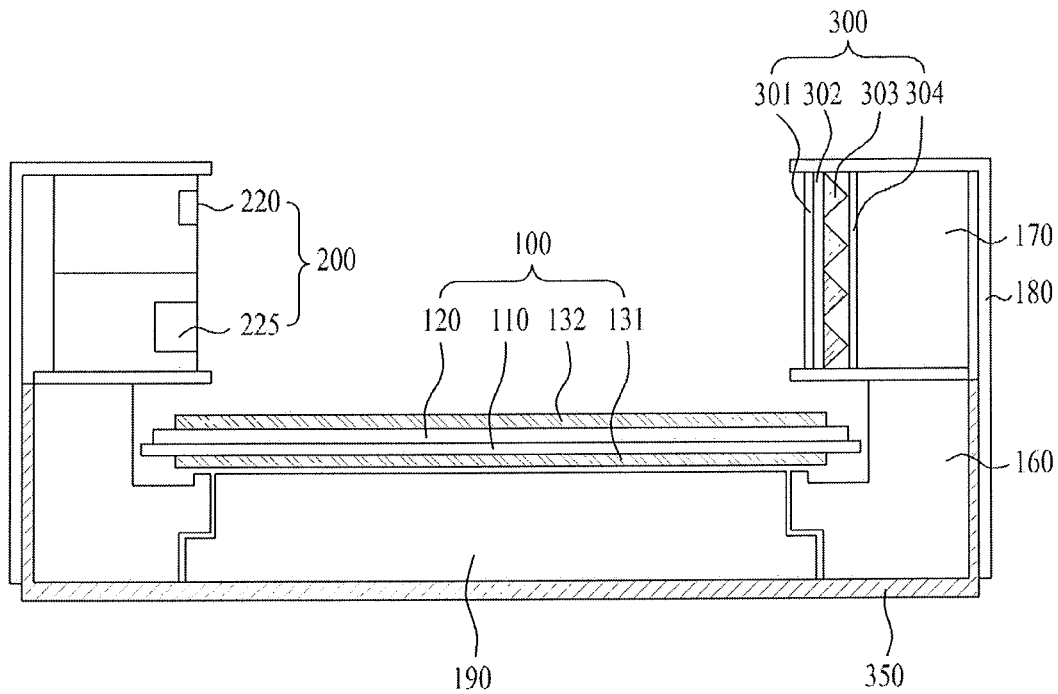
FIG. 3 is a sectional view along a diagonal line in rightward/leftward and upward/downward directions.

FIG. 2a is a plan view illustrating an optical touch input system according to an embodiment of the present invention. FIG. 2b is a rear-perspective views illustrating a corner of the optical touch input system not having an optical sensor module (emitter-detector module) as shown in FIG. 2a. FIG. 3 is a sectional view along a diagonal line in rightward/leftward and upward/downward directions.

As shown in FIGS. 2a and 3, according to the display device including the optical touch input system, at least two optical sensor modules 200 are located at one, two, or three corners of a display panel 100. Guide structures 170 are provided in four sides of the display panel 100. The optical sensor modules 200 and retro-reflectors 300 are attached to an inner surface within the guide structures 170. The retro-reflector 300 includes a retro-reflecting layer formed of a prism serially disposed in a plurality of columns. The display panel 100, the optical sensor modules 200, the guide structures 170, and the retro-reflector 300 constitute optical touch input system.

A guide structure connecting part 170a is provided at a corner of the display panel 100 between adjacent guide structures 170. Reference numeral 170a denotes the guide structure connecting part that does not mount a corresponding optical sensor module 200 thereto. The guide structure connecting part 170*a* is disposed between and couples two adjacent guide structures 170. The guide structure connecting part 170*a* does not have mounted thereto a corresponding optical sensor module 200, but rather, faces an optical sensor module located in a diagonally opposite corner. The retro-reflectors 300 located along an inner wall of the guide structure 170 functions to retro-reflect infrared light. Light incident from the optical sensor module 200 located diagonal to the guide structure connecting part 170*a* may be retro-reflected.

As shown in FIG. 3, the optical sensor module 200 is a module including an emitter, such as an infrared LED lens 220 and a detector 225 receiving an infrared ray, such as a photo sensor. The optical sensor module 200 may be contained in a signal module or package, or may be formed of separate components. For example, a separate emitter and a separate photo sensor may be operatively secured to the optical touch input system or guide structures 170. The optical sensor modules 200 and the retro-reflector 300 may be located along horizontal surfaces with respect to the display panel 100, such that the beam receiving and emitting form the optical sensor modules 200 may be implemented without interference. In addition, because the light emitted by the optical sensor modules 200 is in the infrared region, there is no interference with light in the visible range emitted by the display panel 100.

The photo sensor is a linear array and includes a plurality of pixels arranged in a series on a PCB. The PCB may be directly connected to a touch controller (the component "500" shown in FIG. 12) via a FPC (Flexible Printed Cable) 250. The touch controller is connected to or contained in a control unit or processor (not shown) of the display panel. In the latter's case, the optical sensor module 200 may be directly controlled by the control unit of the display panel. The control unit may be a microprocessor, microcontroller, or other suitable processor, and may execute software to implement establishing references and/or auto-calibration and/or auto-correction regardless of tilt or misalignment of the optical sensor modules 200. The touch controller 500 may detect correct touch by establishing a new reference regardless of misalignment or tilt of the optical sensor modules. The FPC is folded at a rear surface of the optical sensor module 200, and double-sided tape (not shown) is placed on a side surface of a case top 180 to secure it thereto.

The resolution of the detector 225 may be 500 pixels or more in a horizontal direction. In other case, the detector 225 may be an area sensor array.

In one embodiment, the detector 225 of the optical sensor modules 200 may be configured to receive the light retro-reflected from at least two sides (and originally emitted by that module) and the light emitted from the other optical sensor module ("direct light") located at the diagonally opposed corner.

Each of the optical sensor modules 200 may be configured to sense obstruction of light reflected from the retro-reflector 300 when there is a touch that blocks the light.

In some embodiments, the optical sensor modules 200 may be replaced with waveguide units capable of receiving and emitting infrared light. The display panel 100 may be a liquid crystal panel, an organic luminescence display panel, a plasma display panel, or an electro-phoretic display panel. The embodiment shown in FIG. 3 represents the liquid crystal panel, and the present invention is not limited to use of such a display panel. Any suitable type of display panel may be used.

For example, if the display panel 100 is a liquid crystal panel, the display panel 100 includes first and second substrates 110 and 120, which are oppositely disposed to each other, with a liquid crystal layer (not shown) disposed therebetween. First and second polarizing plates 131 and 132 are disposed on the back surfaces of the first and second substrates 110 and 120, respectively.

A backlight unit 190 may be located under the display panel 100, and a support main 160 supports the backlight unit 190, the display panel 100, and the guide structures 170. A cover bottom 350 is provided to cover the backlight unit 190 and the support main 160.

In addition, the case top 180 is provided to surround and cover the guide structures 170, the retro-reflector 300, the optical sensor modules 200, and edges of the display panel. In this arrangement, the case top 180 covers the cover bottom 350 from a side direction. The case top 180 and the cover bottom 350 may be part of a casing structure or housing. In one embodiment, the housing or casing structure may include the support main 160, the guide structure 170, the case top 180, and the cover bottom 350, whether or not such components are separate and independent components.

The guide structure 170 may be disposed to make the display panel 100 projected upward such that a lower portion of the guide structure 170 may support the retro-reflector 300 and secure the connection between the retro-reflector 300 and the guide structure 170.

The components of an optical touch input system may be covered by the case top 180 so that such components are not exposed. Because the case top 180 is spaced apart a predetermined distance from the display panel, the overall structure of the optical touch input system may be thin, even with inclusion of the optical sensor module.

The retro-reflector 300 includes a retro-reflecting layer 303, first and second adhesive layers 302 formed on top and bottom surfaces of the retro-reflecting layer 303, respectively, and a first optical filter 301 formed on the first adhesive layer 302.

The retro-reflector 300 is attached to the inner surface of the guide structures 170 by the second adhesive layer 304 and it is formed adjacent to the optical sensor modules 200 located at the corners. As shown in FIGS. 2*a* and 2*b*, the guide structure connecting part 170*a* is diagonally opposite a vertex a prism component of the retro-reflecting layer 303 in a corresponding retro-reflector 300. Due to such placement and construction, efficiency of diagonally-opposed reflected light is maximized.

In addition, the retro-reflector 300 is formed as a cube-corner type structure, which is particularly efficiency with respect to reflecting light received at an incident angle of 0° to 65°, and may be in the form of a serially-disposed micro-prism.

The first optical filter 301 transmits only infrared rays having a wavelength of approximately 700 nm or more. The first optical filter 301 may be formed of acrylic resin, for example, PMMA (Poly Methyl Methacrylate) or Polycarbonate.

In other embodiments, the first optical filter 301 may be formed of black resin having an infrared ray absorption property so as to transmit only the infrared light. The first optical filter 301 may also include a glass component.

The retro-reflector 300 receives and retro-reflects the light emitted from the optical sensor modules 200. Retro-reflected light, by definition, is the light emitted by a particular emitter and retro-reflected by the reflectors, which is then received back by the detector in the same optical sensor module that emitted the light.

In one embodiment, the retro-reflector 300 is disposed on the display panel 100, corresponding to at least three sides of the display panel 100, and it is attached to portions of the guide structures 170. The infrared optical sensor modules 200 may be disposed on corresponding corners of the display panel 100, and are generally disposed in the same plane as the retro-reflector 300. The infrared optical sensor modules 200 may be located on the same plane with the guide structures 170.

The drawings show three optical sensor modules 200, which prevents the dead zone that occurs in the optical touch input system of related art described above. A dead zone along a side between the two optical sensor modules can be sensed by the third optical sensor module. Thus, ghosts or false touches generated using only two optical sensor modules may be removed by the third optical sensor module.

In another embodiment, optical sensor modules 200 may be provided in all of the four corners of the optical touch input system. In this case, the retro-reflectors 300 may be located in each of the four sides. Compared with the arrangement described above, in this specific embodiment, there are no corners without the optical sensor modules.

However, the invention is not be limited to the above embodiments. Using only two optical sensors, specific algorithms may be used to remove the dead zone or ghost. The optical touch input system according to embodiments of the present invention will be described below, with emphasis on the method of compensating for physical misalignment or tilt of the infrared optical sensor modules 200.

Figure 4:
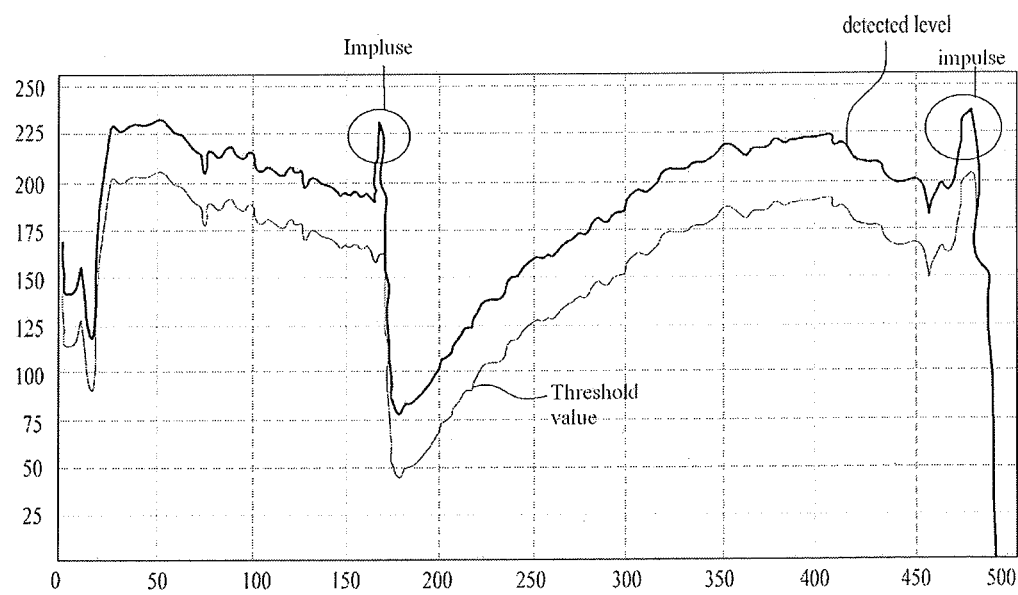
FIG. 4 is a graph illustrating detected intensity of light and threshold value in one optical sensor module along pixels in the optical touch input system.

FIG. 4 is a graph illustrating detected intensity of light and threshold value in one optical sensor module along pixels in the optical touch input system.

As shown in FIG. 4, when intensity of light of a single optical sensor module is detected using optical sensor module having resolution of 500 pixels, where a relatively high intensities of light are shown at approximately a 19th pixel, a 165th pixel and a 481st pixel.

Here, areas of the display panel 100 corresponding to 0~19th pixels and 481~500th pixels of the detector 225 are covered by the neighboring retro-reflector and the guide structures. That is, even though the optical sensor module 200 can independently sense viewing angle within range of 96° or more, the optical sensor module in the optical touch input system can substantially sense viewing angle within range of only 90° since the area of the display panel 100 corresponding to 0~19th pixels and 481~500th pixel are covered by the retro-reflector and the guide structure. Therefore, detected values in $0 \sim 19^{th}$ pixels and $481 \sim 500^{th}$ pixel of the detector 225 are excluded from an effective value.

The viewing angle 0~90° in which intensity of light can be substantially detected is called to "effective viewing angle." A start point corresponding to reference angle 0° and an end point corresponding to reference angle 90° can be mapped by detecting outstanding difference of intensity of light at pixels of the detector 225. The start point and end point corresponding to the reference angle 0° and the reference angle 90° of the effective viewing angle may be varied according to position of the optical sensor module 200. Even though the optical sensor module 200 in the optical touch input system is misaligned, the start point and the end point are newly established by the method of establishing references in the present invention. It makes possible to detect correct touch based on the newly established references. Such mapping between the pixels and reference angles is also called to "correlation."

As shown in FIG. 4, the pixel points having the high intensity of light such as "impulse" correspond to direct lights emitted from the emitters of the other optical sensor modules, whether located diagonally opposite or at non-diagonal corners, depending upon the number of optical sensor modules included in the optical touch input system. That is, the pixel points having the relatively high intensity of light are detected based on light received from the emitters of the other optical sensor modules located at a diagonally opposite corner or at a 0 degree and/or 90 degree corner.

In one embodiment, the optical sensor modules having the detector or light sensor and a light emitter are integrated in a single component package, are mounted at three corners of the display panel 100. Each of the optical sensor modules senses light emitted (direct light) from the other infrared optical sensor modules located at the other corners. The direct light is considered to be a point source of light. Each of the direct light received from the emitters of the other optical sensor modules has a property of an impulse, which appears brighter than the retro-reflected light from the retro-reflector since the direct light is concentrated light as a point. The impulse corresponds to light received from the emitters of the other optical sensor modules, and the impulses may be determined to be reference points corresponding to reference angles. In this case, the reference angles are determined as particular angles if a size of the display panel is determined. In example, when the display panel 100 has shown in FIG. 4 a 16:9 aspect ratio, there are two impulses and the reference angles corresponding to the impulses are 29.3° and 90°.

If there are 4 optical sensor modules at 4 corners of the display panel, one optical sensor module senses 3 impulses from the other 3 optical sensor modules, and if there are 2 optical sensor modules at 2 corners of the display panel, one optical sensor module senses 1 impulse from the other sensor module. In this case, the reference is sensed by each detector in the optical sensor modules with detecting a direct light (direct lights) from the emitter of another optical sensor modules or the emitter located at another corners.

In addition, a touch sensing error which might be generated when the optical sensor modules are mounted to a display panel in a misaligned or tilted state is prevented. Because relative references between one optical sensor module and the other optical sensor module(s) are newly established when a power is applied to the optical touch input system, as described below.

A method of establishing references in the optical touch input system based on the direct lights received from emitters located at the corners will be described.

First Embodiment

Figure 5:
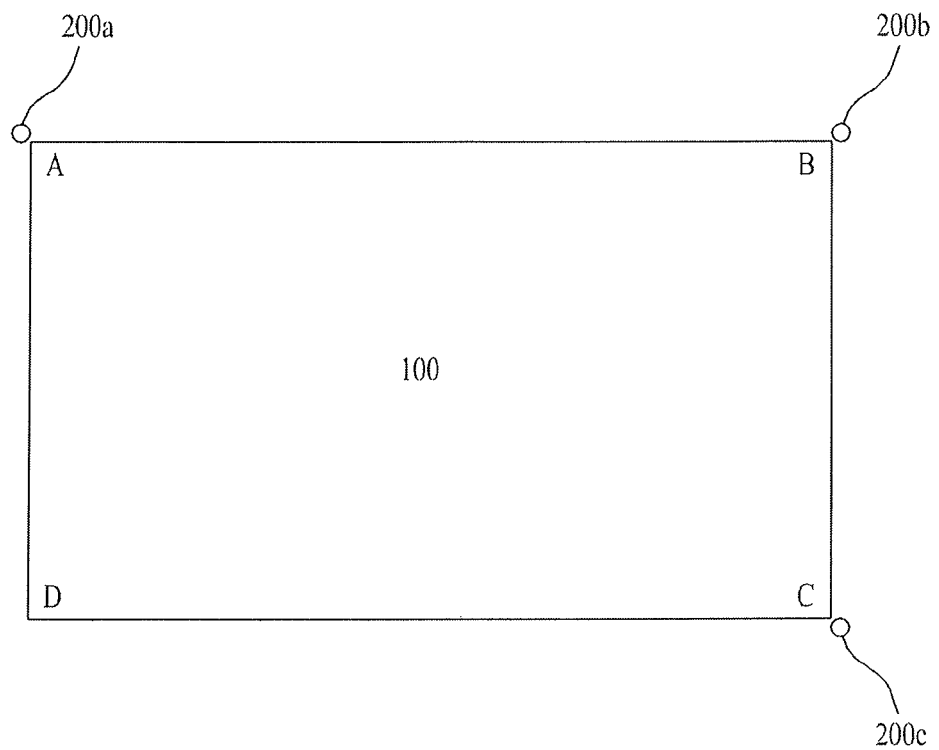
FIG. 5 is a diagram illustrating an optical touch input system having three optical sensor modules at three corners of a display panel according to a first embodiment of the present invention.
Figure 6A:
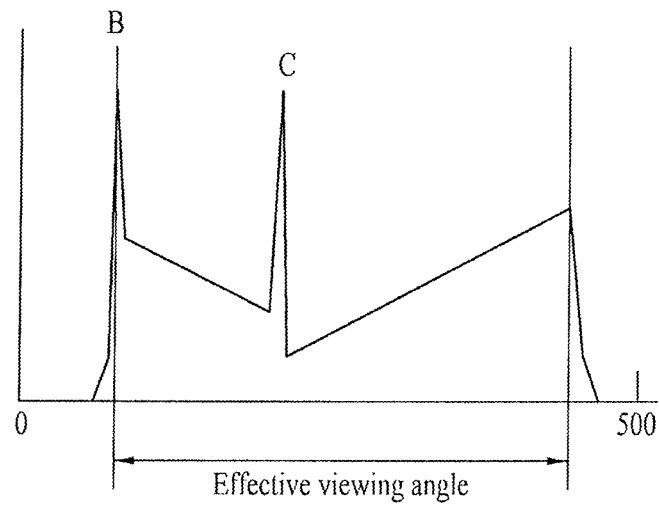
FIGS. 6a~6c are graphs illustrating detected intensities of light in a first~a third optical sensor modules, respectively.
Figure 6B:
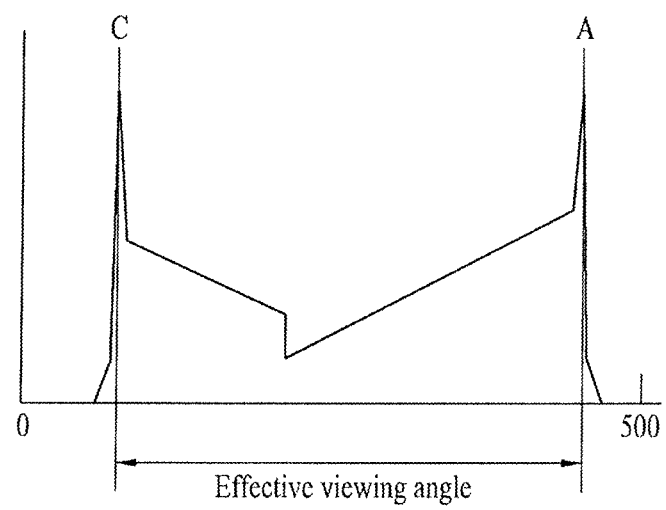
Figure 6C:
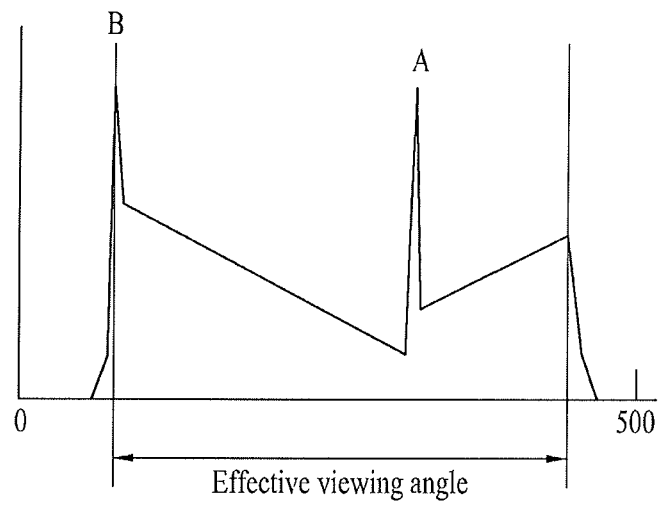
Figure 7A:
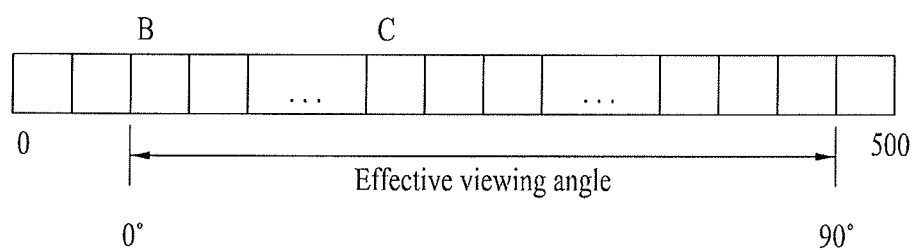
FIGS. 7a~7c are diagrams illustrating reference points detected in the first~the third optical sensor modules, respectively, shown in FIGS. 6a~6c.
Figure 7B:
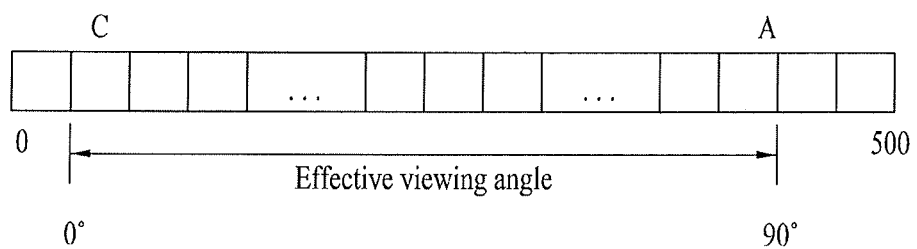
Figure 7C:
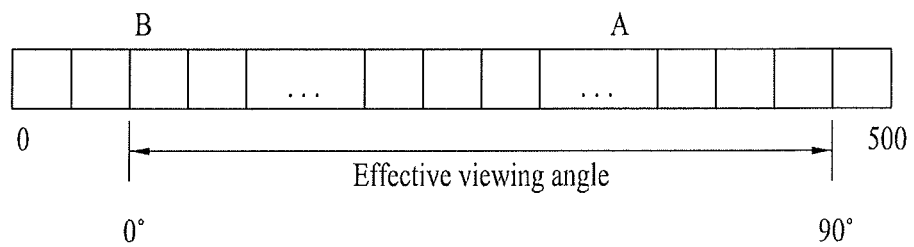

FIG. 5 is a diagram illustrating an optical touch input system having three optical sensor modules at three corners of a display panel according to a first embodiment of the present invention. FIGS. 6a~6c are graphs illustrating detected intensities of light in a first~a third optical sensor modules, respectively. FIGS. 7a~7c are diagrams illustrating reference points detected in the first~the third optical sensor modules, respectively, shown in FIGS. 6a~6c.

From the first optical sensor module 200a to third optical sensor modules 200c are disposed at three corners A, B, C of the display panel 100.

Each of the first~the third optical sensor modules 200a, 200b, 200c has an emitter emitting infrared ray and a detector sensing infrared ray. The detector has the above photo sensor array including pixels.

As shown in FIG. 6A, when the detector of first optical sensor module 200a senses intensity of light along pixels, there are 2 impulses corresponding corners B, C. The corners B, C are points which the second optical sensor module 200b and the third optical sensor modules 200c are located at. According to the two impulses, the detector of the first optical sensor module 200a can establish a reference point to the reference angle about 0° and a reference point to the reference angle about 30° in the pixels of the detector. The reference angle about 0° and about 30° correspond to corner B which the second optical sensor module and corner C which the third optical sensor module.

As shown in FIG. 6B, when the detector of second optical sensor module 200b senses intensity of light along pixels, there are 2 impulses corresponding corners C and A. The corners C, A are points which the third optical sensor module 200c and the first optical sensor modules 200a are located at. According to the two impulses, the detector of the second optical sensor module 200b can establish a reference point to the reference angle about 0° and a reference point to the reference angle about 90° in the pixels of the detector. The reference angle about 0° and about 90° correspond to corner C which the third optical sensor module and corner A which the first optical sensor module 200a. In this case, the reference angles between about 0° and about 90° are effective viewing angle and detecting touch from the touch controller is processed based on the intensity of light in the pixels corresponding the effective viewing angle.

As shown in FIG. 6C, when the detector of third optical sensor module 200c senses intensity of light along pixels, there are 2 impulses corresponding corners B and A. The corners B, A are points which the second optical third module 200b and the first optical sensor modules 200a are located at. According to the two impulses, the detector of the third optical sensor module 200c can establish a reference point to the reference angle about 0° and a reference point to the reference angle about 60° in the pixels of the detector. The reference angle about 0° and about 60° correspond to corner B which the second optical sensor module and corner A which the first optical sensor module 200a.

The reference angles about 30°, about 60° excluding the reference angles 0°, 90° can be varied with regard to an aspect ratio of the display panel 100. In example, when the aspect ratio of the display panel 100 is 16:9, the first optical sensor senses the corner C as reference angle 29.3°. If the aspect ratio of the display panel 100 is not 16:9, the first optical sensor senses the corner C as reference angle is greater than Wand less than 90°.

The corner D is preferable to be diagonally processed as shown in FIGS. 2A and 2B to emit light as similar "impulse" at the corner D.

The method of establishing a reference in the first embodiment comprises the following.

Firstly, the emitters located of the second and third optical sensor modules 200b, 200c at respective corners B, C of a display panel 100 emit light and the detector of the first optical sensor modules 200a located at the corner A of the display panel receives or senses direct light.

The detector at the third corner detects respective first and second impulse signals generated by the direct light of the emitters located at the corners B and C.

The respective first and second impulse signals correspond to pixel positions of the detectors located at the corner A.

After then, the touch controller correlates the respective pixel positions of the respective first and second impulse signals with respective predetermined first and second reference angles about 0° and 30°.

In the same way, the detectors of the second and third optical sensor modules 200b, 200c sense and detect the pixels in the detector with regard to the reference angles of the display panel.

Second Embodiment

Figure 8:
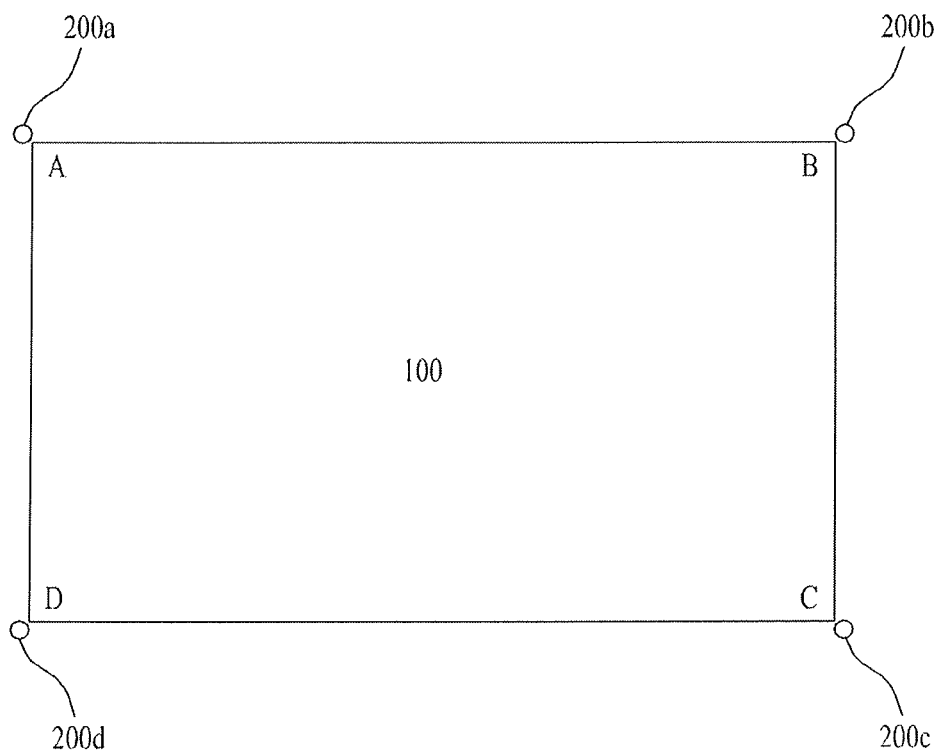
FIG. 8 is a diagram illustrating an optical touch input system having four optical sensor modules at four corners of a display panel according to a second embodiment of the present invention.
Figure 9:
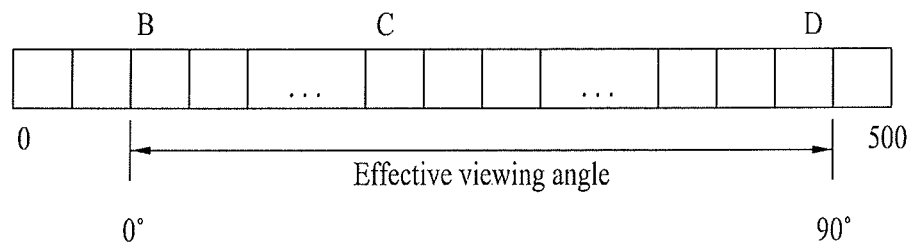
FIG. 9 is a diagram illustrating reference points detected in a first optical sensor module shown in FIG. 8.

FIG. 8 is a diagram illustrating an optical touch input system having three optical sensor modules at four corners of a display panel according to a second embodiment of the present invention. FIG. 9 is a diagram illustrating reference points detected in a first optical sensor module shown in FIG. 8.

As shown in FIG. 8, from the first optical sensor module 200a to fourth optical sensor modules 200d are disposed at three corners A, B, C, D of the display panel 100.

Each of the first~the fourth optical sensor modules 200a, 200b, 200c and 200d has an emitter emitting infrared ray and a detector sensing infrared ray. The detector has the above photo sensor array including pixels.

As shown in FIG. 9, when the detector of first optical sensor module 200a senses intensity of light along pixels, there are 3 impulses corresponding corners B, C, D. The corners B, C, D are points which the second optical sensor module 200b, the third optical sensor modules 200c and the fourth optical sensor module 200d are located at. According to the three impulses, the detector of the first optical sensor module 200a can establish a reference point to the reference angle about 0°, a reference point to the reference angle about 30° in the pixels of the detector and a reference point to the reference angle about 90°. The reference angle about 0°, about 30° and 90° correspond to the corner B which the second optical sensor module 200b, the corner C which the third optical sensor module 200c and the corner D which the fourth optical sensor module 200d.

The method of establishing a reference according to the second embodiment includes the following.

Firstly, the emitters of the second~the fourth optical sensor modules 200b, 200c, 200d located at respective the corners B, C, D of a display panel 100 emit light and the detector of the first optical sensor modules 200a located at corner A of the display panel 100 receives direct light.

The detector at the corner A detects respective first, second, and third impulse signals generated by the direct light of the emitters of the second~the fourth optical sensor modules 200b, 200c, 200d located at the respective corners B, C, D.

The respective first, second, and third impulse signals correspond to pixels of the emitters located at the corners A.

After then, the touch controller correlates the respective pixel positions of the respective first and second impulse signals with respective predetermined first, second and third reference angles about 0°, 30° and 90°. The second reference angle can be varied as predetermined angle greater than 0° and less than 90° according to the aspect ratio of the display panel 100.

A the first reference angle corresponds to one end of a region of interest of the display panel 100, and the third reference angle corresponds to another end of the region of interest.

The respective first, second, and third emitters can be sequenced to generate the respective first, second, and third impulse signals. Each of the respective first, second, and third emitters are sequenced so that only one emitter is emitting light while the remaining emitters are not emitting light.

Otherwise, the respective first, second, and third emitters can be simultaneously illuminated to generate the respective first, second, and third impulse signals.

The fourth corner includes an emitter which is turned off while detecting the first, second, and third impulse signals.

The intensity of emitting by the emitters when establishing the reference is smaller than intensity of emitting by the emitters when detecting a touch. Or on time of emitting by the emitters when establishing the reference is smaller than on time of emitting by the emitters when detecting a touch.

In the same way, the detectors of the second, third and fourth optical sensor modules 200b, 200c, 200d sense and detect the pixel positions in the detector with regard to the reference angles of the display panel.

Third Embodiment

Figure 10:
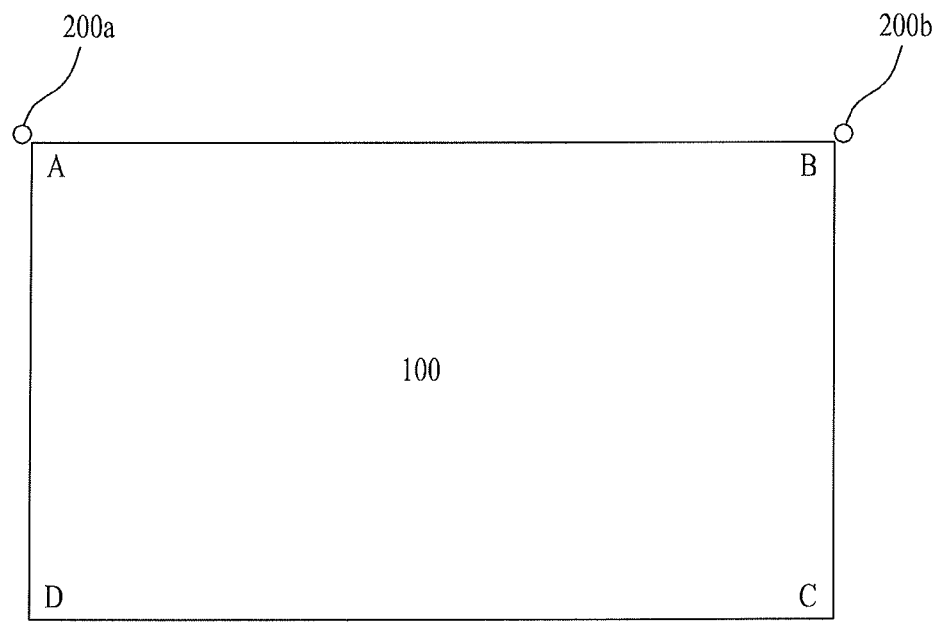
FIG. 10 is a diagram illustrating an optical touch input system having two optical sensor modules at two corners of a display panel according to a third embodiment of the present invention.

FIG. 10 is a diagram illustrating an optical touch input system having two optical sensor modules at two corners of a display panel according to a third embodiment of the present invention.

As shown in FIG. 10, when two optical sensor modules are disposed at two corners A, B of the display panel, the method for establishing reference of the optical touch input system is be described as following. In this case, it is considered that the third and fourth optical sensor modules are omitted.

An emitter of the first optical sensor module 200a located at the corner A of a display panel 100 emits light, and a detector of the second optical sensor module 200b located at the corner B of the display panel 100 receives direct light.

The detector at the corner B detects a first impulse signal generated by the direct light of the emitter located at the corner A. The first impulse signal corresponds to a pixel position of the detector located at the second corner B.

Touch controller correlates the pixel position of the first impulse signal with a predetermined reference angle of the display panel 100.

An emitter of the second optical sensor module 200b located at the corner B of a display panel 100 emits light, and a detector of the first optical sensor module 200a located at the corner A of the display panel 100 receives direct light.

The detector at the corner A detects a second impulse signal generated by the direct light of the emitter located at the corner B. The second impulse signal corresponds to a pixel position of the detector located at the second corner A.

Touch controller correlates the pixel position of the second impulse signal with a predetermined reference angle of the display panel 100.

Figure 11:
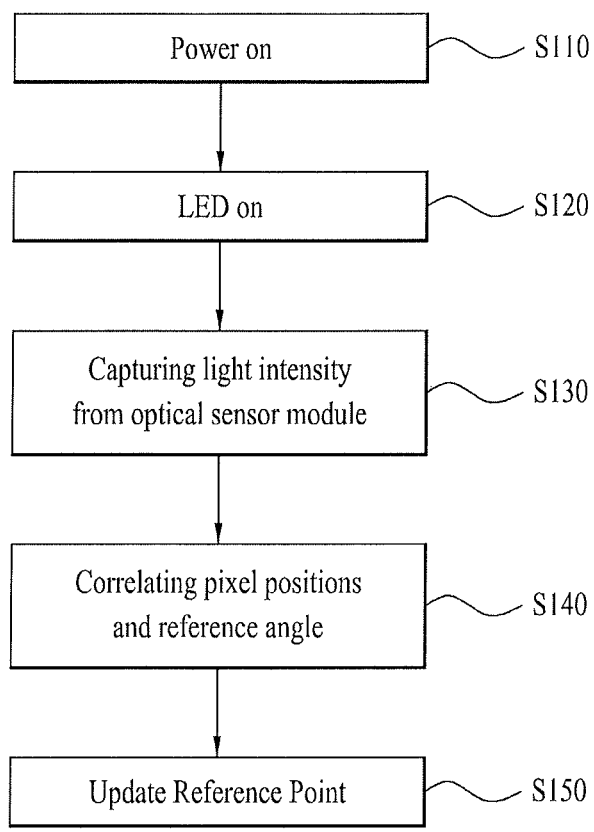
FIG. 11 is a flow chart for establishing references in an optical touch input system.

FIG. 11 is a flow chart for establishing references in an optical touch input system.

As shown in FIG. 11, the method of establishing references in the optical touch input system will be described as follows.

First, a power is applied to the optical touch input system (S110).

Next, to automatically establish references, the emitters of the optical sensor modules are emitted (S120). Such establishing references are processed during a short time and establishing reference is simultaneously processed with or immediately after applying the power to the optical touch input system. In some cases, such establishing reference may be processed as user's adjusting during turning on the optical touch input system.

Next, intensity of light from the emitters of the optical sensor modules (IR sensor) are captured and sensed at each detector of the optical sensor modules (S130).

Here, the respective emitters can be sequenced to generate the respective impulse signals. Each of the respective emitters are sequenced so that only one emitter is emitting light while the remaining emitters are not emitting light. Otherwise, the respective emitters can be simultaneously illuminated to generate the respective impulse signals.

The intensity of emitting by the emitters when establishing the reference is smaller than intensity of emitting by the emitters when detecting a touch. Or on time of emitting by the emitters when establishing the reference is smaller than on time of emitting by the emitters when detecting a touch.

Next, the touch controller detects impulse signals form the emitters and detects pixels corresponding to the pixel positions of the detectors in the optical sensor modules. And, the pixel positions are correlated to the reference angles corresponding to corners in the display panel (S140).

In such process, the direct light emitted from the corners is distinguished from the reflected light from the retro-reflector. In the corner where the optical sensor module is not formed, the diagonally-processed shape makes possible to emit light of impulse type.

Next, reference points are established to the pixel positions in each detector of the optical sensor modules (S150).

Based on the reference points, effective viewing angle of each detector in optical sensor modules are set.

The reference angles may be approximately 0°, 29.3°, 60.1° and 90°.

In the process, the optical sensor module whose detector senses the intensity of light and the optical sensor module whose emitter emits direct light are different.

Figure 12:
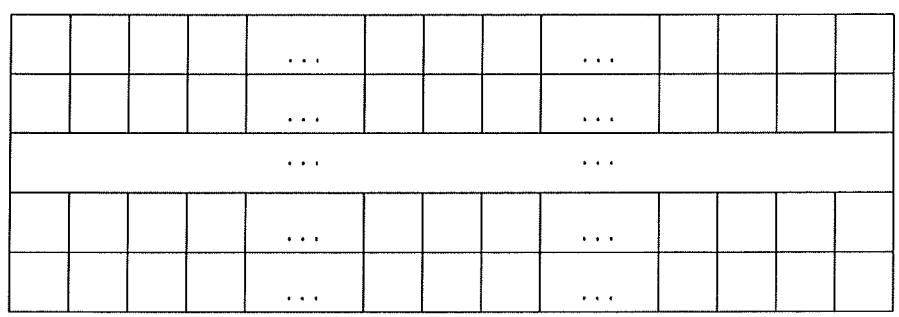
FIG. 12 is a diagram illustrating different embodiment of a detector in the optical sensor module.

FIG. 12 is a diagram illustrating different embodiment of a detector in the optical sensor module.

As shown in FIG. 12, the detector of the optical sensor module may be an area sensor array. In this case, the area sensor array can capture intensity of light as two dimension.

Figure 13:
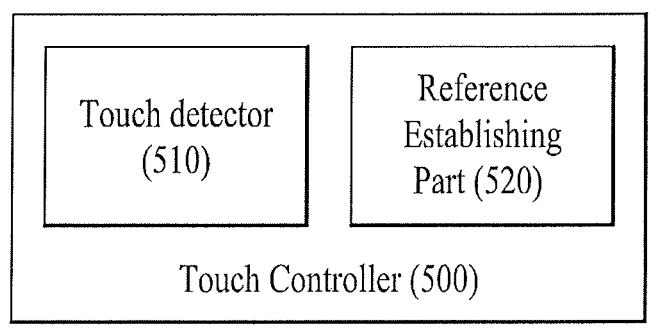
FIG. 13 is a block diagram illustrating a touch controller in the optical touch input system.

FIG. 13 is a block diagram illustrating a touch controller in the optical touch input system.

As shown in FIG. 13, the touch controller 500 has a touch detector 510 detecting touch and a reference establishing part 520 as the above process. The touch controller 500 is included in the optical touch input system and may be contained in the display controller.

A principle of the touch sensing error detecting method will be described below.

Figure 14:
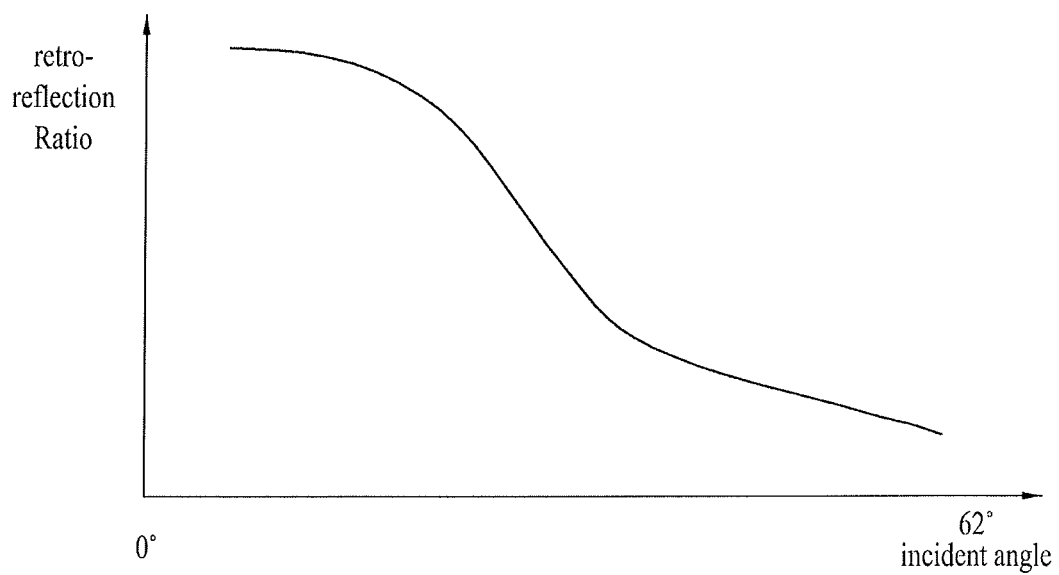
FIG. 14 is a graph illustrating changes in a retro-reflection ratio according to an incident angle of reflected light reflected by a retro-reflector provided in the optical touch input system.

FIG. 14 is a graph illustrating changes in a retro-reflection ratio according to an incident angle of reflected light reflected by a retro-reflector provided in the optical touch input system.

As shown in FIG. 14, the retro-reflector has almost 100% of an incident percentage at approximately 0° of the incident angle. This value decreases as the incident angle of light approaches 30°, and then decreases significantly as the incident angle of light reaches 62°.

Figure 15:
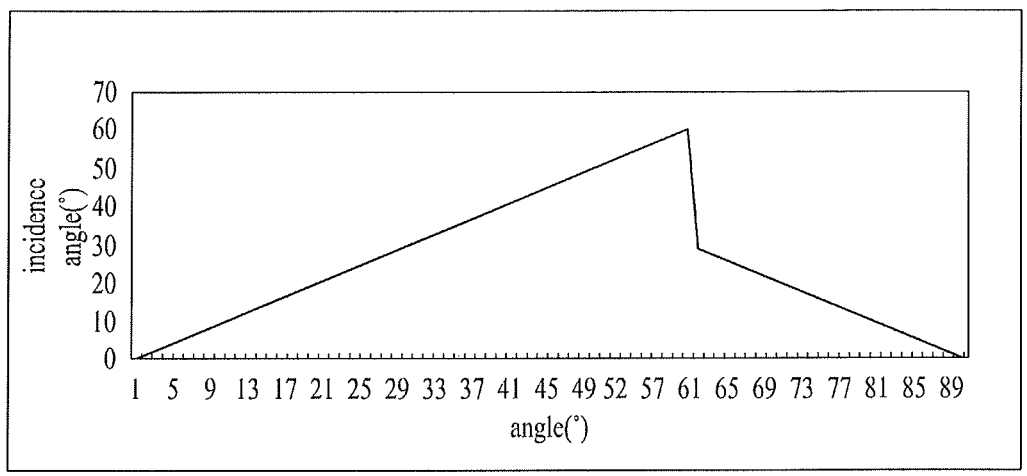
FIG. 15 is a graph illustrating an incident angle for each angle of an optical sensor module located in one corner of a display panel having a 16:9 aspect ratio.
Figure 16A:
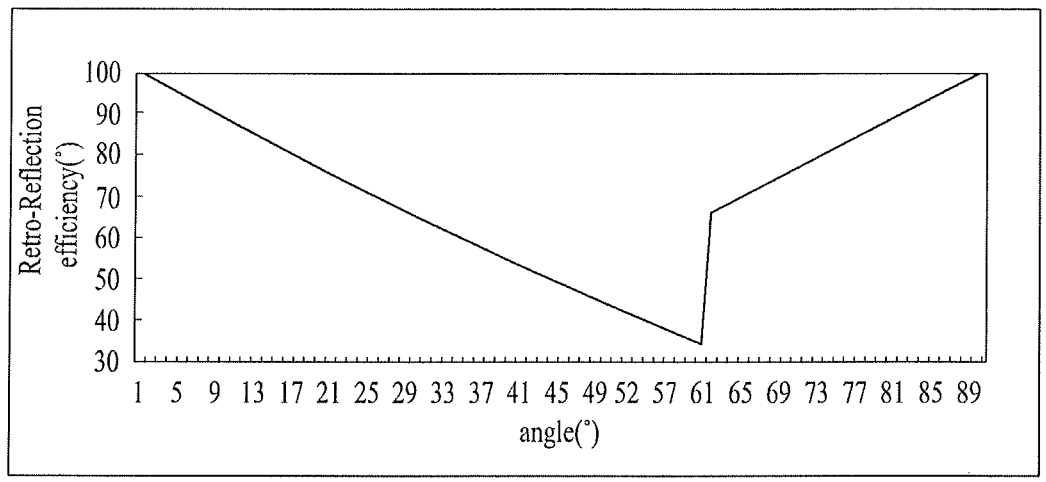
FIG. 16a is a graph illustrating a retro-reflection ratio for each angle of the optical sensor module located in the corner of the display panel having a 16:9 aspect ratio.

FIG. 15 is a graph illustrating an incident angle for each angle of an optical sensor module located in one corner of the display panel having a 16:9 aspect ratio. FIG. 16a is a graph illustrating a retro-reflection ratio for each angle of the optical sensor module located in the corner of the display panel having a 16:9 aspect ratio.

In reference to FIGS. 15 and 16a, when the incident angle of light is decreased from 60° to about 30° with respect to approximately 61°, which is a value computed from the resolution converted into a predetermined angle measured at a measuring position within 90° angle when the resolution of the optical sensor module is 500 pixels. This is a phenomenon which occurs because a direction a vertex of the prism in the retro-reflector changes at a point at which each side of the retro-reflector is bent.

As described in relation with the retro-reflection ratio shown in FIG. 16a, the retro-reflection percentage increases by approximately 40% as the angle changes from 60° to 61°.

This means that the retro-reflection percentage is increasing as the incident angel of light is decreasing. In particular, the retro-reflection percentage is relatively high at the point diagonally opposed point to the infrared optical sensor module. In addition, the incident angle is '0' at points corresponding to 0° or 90° of the measured angle with respect to the infrared optical sensor module, and the retro-reflection percentage is relatively high accordingly.

That is, the light emitted from the infrared optical sensor, with the high incident angle, may be detected based on the impulse light intensity, and the point having the impulse light intensity detected there from may be determined to be the reference points (the measured angle to be 0°, 29.3°, 60.7° and 90°). Based on that, regardless of the misalignment or tilt level of the optical sensor module, correct touch is detected by establishing new references.

Figure 16B:
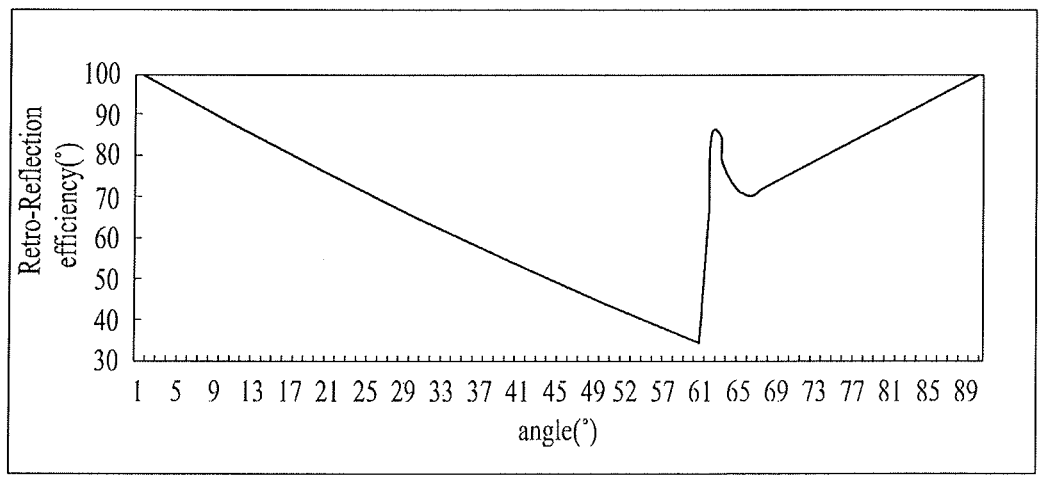
FIG. 16b is a graph illustrating a retro-reflection ratio of the optical sensor module provided in the display panel having a 16:9 aspect ratio.

FIG. 16b is a graph illustrating a retro-reflection ratio of the optical sensor module provided in the display panel having a 16:9 aspect ratio, with the single diagonally opposed optical sensor module.

According to FIG. 16b, the diagonally opposed optical sensor is provided at the point having the measured angle of approximately 61°. The light emitted from the optical sensor module configured to sense the light intensity may be incident on the diagonally opposed corner at approximately 0°, and the almost all of the light is reflected light. Because of that, the point having the measured angle of approximately 61° has intensity of impulse light.

Therefore, according to the optical touch input system, the direct light emitted opposing light sources (any corner), are distinguished from the light that is retro-reflected from the other areas. An automatic calibration algorithm is applied to establish references.

As a result, physical compensating process may be omitted during or after the manufacturing and assembly stage so as to reduce manufacturing time and costs.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of establishing a reference in an optical touch input system, the method comprising:
    emitting light by an emitter located at a first corner of a display panel and receiving direct light by a detector located at a second corner of the display panel;
    the detector at the second corner detecting a first impulse signal generated by the direct light of the emitter located at the first corner, the first impulse signal corresponding to a pixel position of the detector located at the second corner;
    correlating the pixel position of the first impulse signal with a predetermined first reference angle of the display panel;
    emitting light by an emitter located at the second corner of the display panel and receiving direct light by the detector located at the first corner of the display panel;
    the detector at the first corner detecting a second impulse signal generated by the direct light of the emitter located at the second corner, the second impulse signal corresponding to a pixel position of the detector located at the first corner; and
    correlating the pixel position of the second impulse signal with the predetermined second reference angle of the display panel,
    wherein at least one of the predetermined first and second reference angles is 0 degree or 90 degrees, and the at least one of the predetermined first and second reference angles corresponds to one end of a region of interest of the display panel.

2. A method of establishing a reference in an optical touch input system, the method comprising:
    emitting light by emitters located at respective first and second corners of a display panel, and receiving direct light by a detector located at a third corner of the display panel;
    the detector at the third corner detecting respective first and second impulse signals generated by the direct light of the emitters located at the respective first and second corners;
    the respective first and second impulse signals corresponding to pixel positions of the detectors located at the third corners; and
    correlating the respective pixel positions of the respective first and second impulse signals with respective predetermined first and second reference angles of the display panel,
    wherein at least one of the predetermined first and second reference angles is 0 degree or 90 degrees, and the at least one of the predetermined first and second reference angles corresponds to one end of a region of interest of the display panel.

3. A method of establishing a reference in an optical touch input system, the method comprising:
    emitting light by emitters located at respective first, second, and third corners of a display panel, and receiving direct light by a detector located at a fourth corner of the display panel;
    the detector at the fourth corner detecting respective first, second, and third impulse signals generated by the direct light of the emitters located at the respective first, second, and third corners;
    the respective first, second, and third impulse signals corresponding to pixel positions of the detectors located at the fourth corner; and
    correlating the respective pixel positions of the respective first, second, and third impulse signals with respective predetermined first, second, and third reference angles of the display panel,
    wherein the first reference angle is 0 degrees, the third reference angle is 90 degrees, and the second reference angle is greater than the first reference angle and less than the third reference angle and
    wherein the first reference angle corresponds to one end of a region of interest of the display panel, and the third reference angle corresponds to another end of the region of interest.

4. The method of claim 3, wherein the respective first, second, and third emitters are sequenced to generate the respective first, second, and third impulse signals.

5. The method of claim 4, wherein each of the respective first, second, and third emitters are sequenced so that only one emitter is emitting light while the remaining emitters are not emitting light.

6. The method of claim 3, wherein the respective first, second, and third emitters are simultaneously illuminated to generate the respective first, second, and third impulse signals.

7. The method of claim 3, wherein the fourth corner includes an emitter which is turned off while detecting the first, second, and third impulse signals.

8. The method of claim 3, wherein intensity of emitting by the emitters when establishing the reference is smaller than intensity of emitting by the emitters when detecting a touch.

9. The method of claim 3, wherein on time of emitting by the emitters when establishing the reference is smaller than on time of emitting by the emitters when detecting a touch.

10. An optical touch input system, comprising:
    a display panel;

three or more optical sensor modules disposed at three or more corners of the display panel, each of the optical sensor modules with a detector and an emitter;

a retro-reflector disposed corresponding to at least three sides of the display panel; and a touch controller having a first part for detecting touch and a second part for establishing a reference, wherein the reference is sensed by the detector of one optical sensor module with detecting a direct light from the emitter of another optical sensor modules, wherein the second part of the touch controller detects impulse signals from the emitters of the optical, sensor modules and detects pixels corresponding to the pixel positions of the detectors in the optical sensor modules, and correlates the pixels positions of the detectors to reference angles corresponding to corners in the display panel and wherein at least one of the reference angles is 0 degree or 90 degrees, and corresponds to one end of a region of interest of the display panel.

11. The optical touch input system of claim 10, wherein a corner where the optical sensor modules is not disposed at is a diagonally-processed corner.

12. The optical touch input system of claim 10, further comprising a housing enclosing the display panel, the optical sensing module and the retro-reflector.

13. The optical touch input system of claim 10, wherein the detector comprises of a line sensor array.

14. The optical touch input system of claim 10, wherein the detector comprises of an area sensor array.

* * * * *